(12) United States Patent
Nakamura et al.

(10) Patent No.: US 8,442,180 B2
(45) Date of Patent: May 14, 2013

(54) CONTROL ROD POSITION DETECTOR

(75) Inventors: Mitsuharu Nakamura, Yokohama (JP);
Tsukasa Suwazono, Yokohama (JP);
Yoshikazu Ui, Kawasaki (JP); Yutaka Sosa, Yokohama (JP); Goro Yanase, Yokohama (JP); Kazuhiro Kawagoe, Yokohama (JP); Shinichi Ishizato, Yokohama (JP); Norimitsu Komai, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1177 days.

(21) Appl. No.: 11/410,912

(22) Filed: Apr. 26, 2006

(65) Prior Publication Data
US 2007/0086556 A1 Apr. 19, 2007

(30) Foreign Application Priority Data

Apr. 27, 2005 (JP) ................................. 2005-129999

(51) Int. Cl.
*G01B 7/14* (2006.01)
*G21C 17/00* (2006.01)
*G01B 7/00* (2006.01)

(52) U.S. Cl.
USPC ...... 376/258; 376/245; 324/200; 324/207.11; 324/207.13; 324/207.22; 324/207.24

(58) Field of Classification Search .......... 376/228, 376/258, 245, 259; 335/206, 205, 207; 340/181, 340/188, 197, 282; 176/35, 36 R, 19 R, 23, 176/33; 324/200, 207.11, 207.13, 207.22, 324/207.24
See application file for complete search history.

(56) References Cited

U.S. PATENT DOCUMENTS 3,200,645 A * 8/1965 Levins ............................ 73/313
3,656,074 A * 4/1972 Bevilacqua et al. .......... 376/258

(Continued)

FOREIGN PATENT DOCUMENTS

| JP | 54-103989 | 8/1979 |
| JP | 55-122101 | 9/1980 |

(Continued)

OTHER PUBLICATIONS

Catalog SC-1, "Sensor & switch solutions for specific control & automation challenges", Singular Control; Issue No. 4;Jan. 5, 2003; p. 60, Slack-wire switches. Magnetic reed switches. Gear switches . . . well as rotating spindle switches . . . www.singularcontrols.com/catalogs/SingAutoCatalog.pdf]).*

(Continued)

*Primary Examiner* — Bernarr Gregory
(74) *Attorney, Agent, or Firm* — Oblon, Spivak, McClelland, Maier & Neustadt, L.L.P.

(57) ABSTRACT

A control rod position detector including a permanent magnet that is attached on a control rod inserted in a reactor pressure vessel, where the permanent magnet is capable of moving together with the control rod, and a plurality of reed switch mechanisms that are arranged in the reactor pressure vessel at regular intervals in an insertion direction of the control rod. Each of the reed switch mechanisms is provided with a pair of reed switches that are placed so as to overlap with each other in the insertion direction of the control rod. The pair of reed switches are connected to a common wiring. The common wiring is connected to a detector that detects a position of the control rod based on signals from the reed switches.

2 Claims, 6 Drawing Sheets

U.S. PATENT DOCUMENTS

| | | | | |
|---|---|---|---|---|
| 3,976,963 A | * | 8/1976 | Kubler | 335/206 |
| 4,014,741 A | * | 3/1977 | Foxworthy et al. | 376/258 |
| 4,053,355 A | * | 10/1977 | Vuckovich | 376/258 |
| 4,064,451 A | * | 12/1977 | Foxworthy | 324/207.13 |
| 4,145,251 A | | 3/1979 | Qurnell | |
| 4,227,057 A | * | 10/1980 | Kubler | 200/84 C |
| 4,380,527 A | | 4/1983 | Graftieaux et al. | |
| 6,380,734 B1 | * | 4/2002 | Chari et al. | 324/207.24 |

FOREIGN PATENT DOCUMENTS

| | | |
|---|---|---|
| JP | 02-181693 | 7/1990 |
| JP | 05-323086 | 12/1993 |
| JP | 09-264986 | 10/1997 |
| TW | 182063 | 4/1992 |
| TW | 255968 | 9/1995 |
| TW | 429380 | 4/2001 |
| TW | 513726 | 12/2002 |

OTHER PUBLICATIONS

Japanese Office Action with English translation mailed Jan. 22, 2010, in Japanese Patent Application No. 2005-129999. filed Apr. 27, 2005.

* cited by examiner

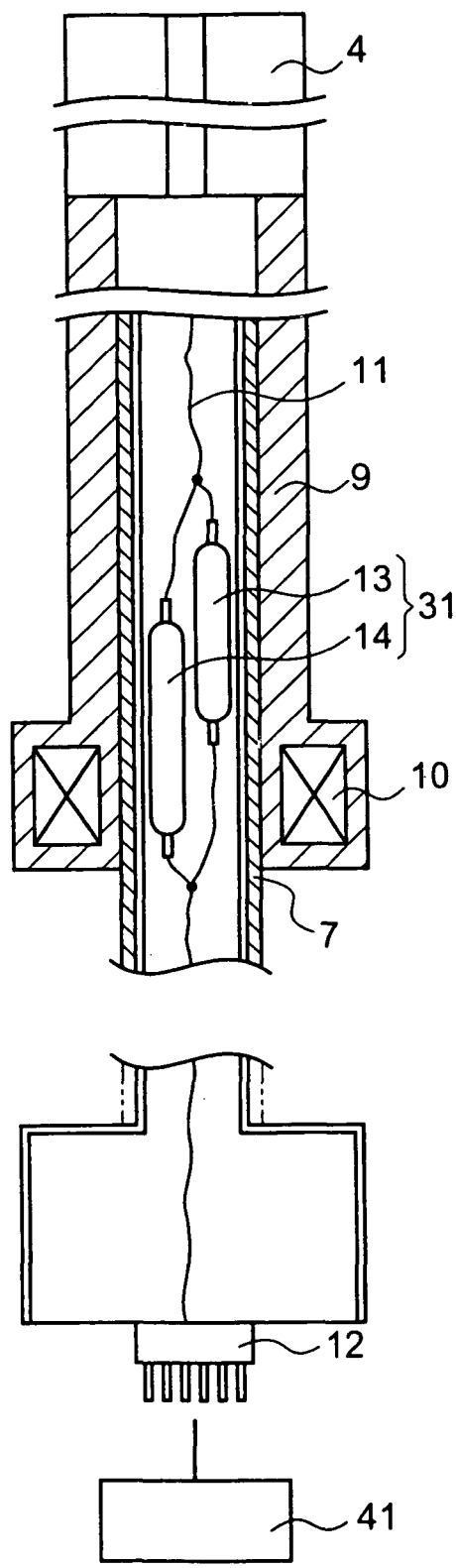
F I G . 1

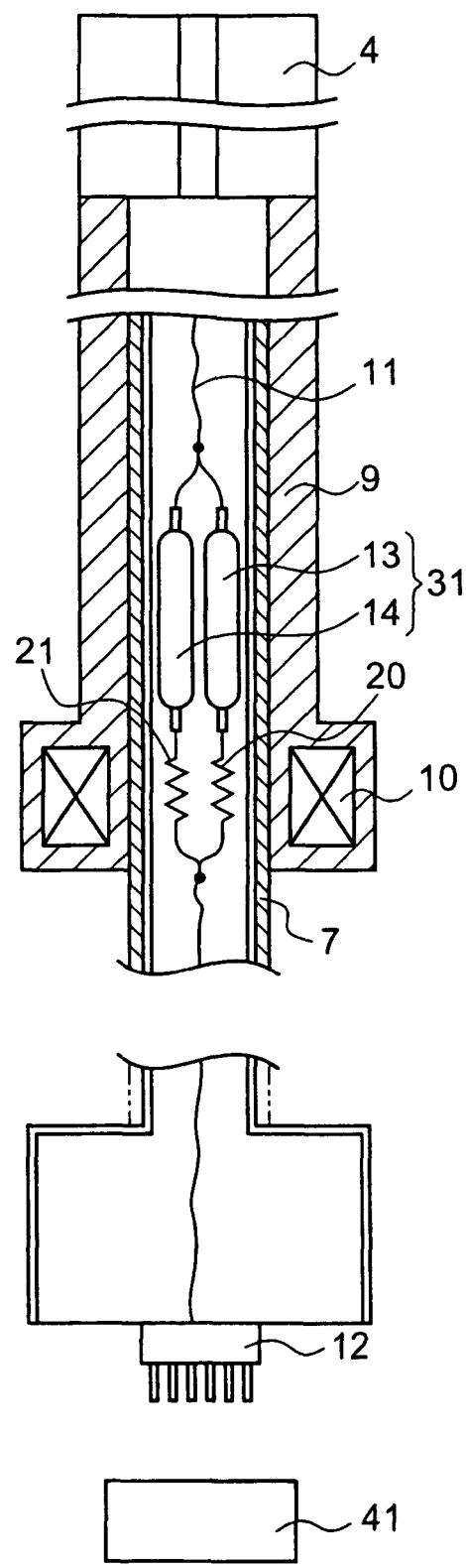
F I G. 3

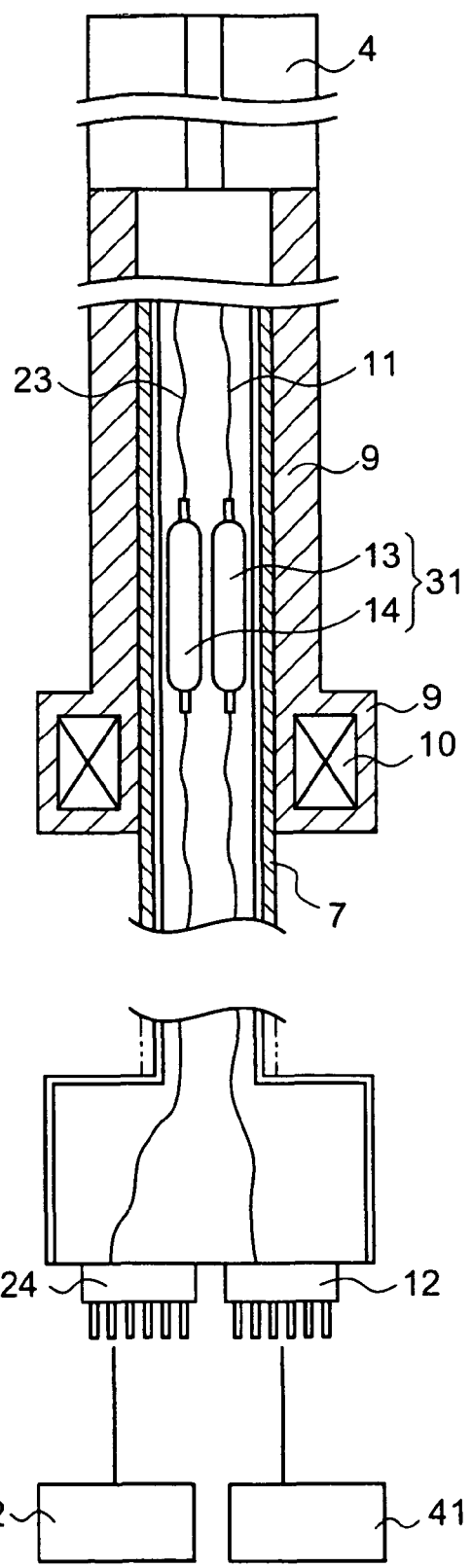
F I G. 4

CONTROL ROD POSITION DETECTOR

BACKGROUND OF THE INVENTION

1. Field of the Invention

The present invention relates to a control rod position detector disposed in a boiling-water reactor pressure vessel.

2. Background Art

With reference to FIG. 5, a general structure of a boiling water reactor as a light water reactor is described. A plurality of fuel assemblies 2 are loaded in a reactor pressure vessel 1 to form a reactor core 3. Control rods 4 are independently inserted from below into the reactor core 3 and drawn therefrom by a control rod driving mechanism 5, whereby an output of the reactor core 3 is controlled. A plurality of control rod driving mechanism housings 6 are arranged on a lower end plate of the reactor pressure vessel 1. The control rod driving mechanism 5 is inserted from below into the control rod driving mechanism housing 6 to be fixed thereto.

As shown in FIG. 6, a conventional control rod position detector is disposed in an indicator tube 7 in the control rod driving mechanism. Reed switches 8 that are opened and closed by a magnetic force are fixed at regular intervals on an inside of the control rod position detector. A driving piston 9 of the control rod driving mechanism includes a ring magnet 10. When the ring magnet 10 is moved in accordance with a vertical movement of the driving piston 9, the reed switch 8 resting on a position corresponding to a position of the ring magnet 10 is excited by the ring magnet 10 and it is then made conductive. The position of the control rod is detected by the conduction signal.

However, during a manufacturing process, a foreign substance may enter an inside of the reed switch, which is used in the control rod position detector. The foreign substance located between contacts of the reed switch interrupts conduction. The reed switch is formed by enclosing two reeds made of a magnetic material in a glass tube, with a predetermined amount of space between the two reeds. Thus, when an impact is given to the control rod position detector while handling the same, a distance between the reeds may change, which leads to a change in sensitivity. Besides, when the glass tube is cracked, an inert gas contained therein may leak to oxidize the contact portions of the reed. This may give rise to an increased contact resistance to interrupt conduction. In these cases, a position of the control rod cannot be detected.

The present invention has been made in view of these disadvantages. The object of the present invention is to provide a control rod position detector that is capable of avoiding and preventing a situation which makes impossible a detection of a position of the control rod, the situation being caused by the above-described reasons.

SUMMARY OF THE INVENTION

The present invention is a control rod position detector comprising: a permanent magnet that is attached on a control rod inserted in a reactor pressure vessel, the permanent magnet being capable of moving together with the control rod; and a plurality of reed switch mechanisms that are arranged in the reactor pressure vessel at regular intervals in an insertion direction of the control rod, the reed switch mechanisms being operated by a magnetic flux of the permanent magnet; wherein: each of the reed switch mechanisms is provided with a pair of reed switches that are placed so as to overlap with each other in the insertion direction of the control rod; the pair of reed switches are connected to a detector through wirings; and the detector detects a position of the control rod based on signals from the reed switches.

In the present invention, the reed switches respectively may have sensing distances; and each of the sensing distances has an overlapped part where the sensing distances of the pair of reed switches overlap with each other, and a non-overlapped part where the sensing distances of the pair of reed switches do not overlap with each other.

In the present invention, when one or the other of the reed switches constituting each reed switch mechanism is malfunctioning, the detector may detect the malfunction of the reed switch based on a change in a sensing distance of the reed switch mechanism.

In the present invention, resisting elements may serially be connected to the respective reed switches in the reed switch mechanisms.

In the present invention, when one or the other of the reed switches constituting each reed switch mechanism is malfunctioning, the detector may detect the malfunction of the reed switch based on a change in a resistance value of the reed switch mechanism.

In the present invention, the reed switches in each reed switch mechanism may respectively be connected to the wirings that are independent from each other.

In the present invention, the respective reed switches in each reed switch mechanism may be connected to the detector through a common wiring.

According to the control rod position detector of the present invention, even when one or the other of the two reed switches is malfunctioning, a situation in which a position of the control rod becomes unknown can be avoided. In addition, since the malfunctioning reed switch can be specified, the malfunctioning reed switch can be repaired at a periodic inspection of a reactor. Thus, a situation in which a position of the control rod becomes unknown can be prevented from occurring.

BRIEF DESCRIPTION OF THE DRAWINGS

FIG. 1 is a longitudinal sectional view showing a first embodiment of a control rod position detector according to the present invention;

FIG. 3 is a longitudinal sectional view showing a second embodiment of the control rod position detector according to the present invention;

FIG. 4 is a longitudinal sectional view showing a third embodiment of the control rod position detector according to the present invention;

DETAILED DESCRIPTION OF THE INVENTION

Embodiments of a control rod position detector according to the present invention will be described below with reference to the accompanying drawings.

First Embodiment

Figure 2:
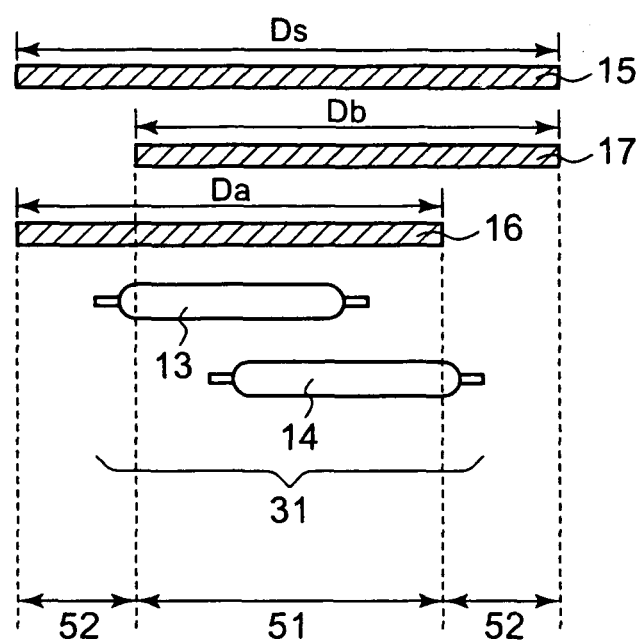
FIG. 2 is a diagrammatic view showing sensing distances of respective reed switches.

FIGS. 1 and 2 are views showing a first embodiment of the present invention.

Figure 5:
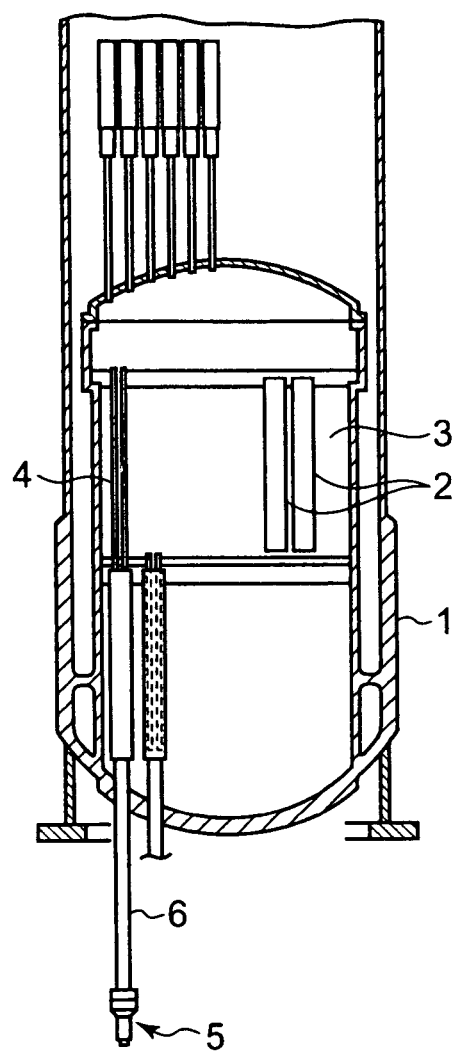
FIG. 5 is a structural view schematically showing a boiling water reactor.
Figure 6:
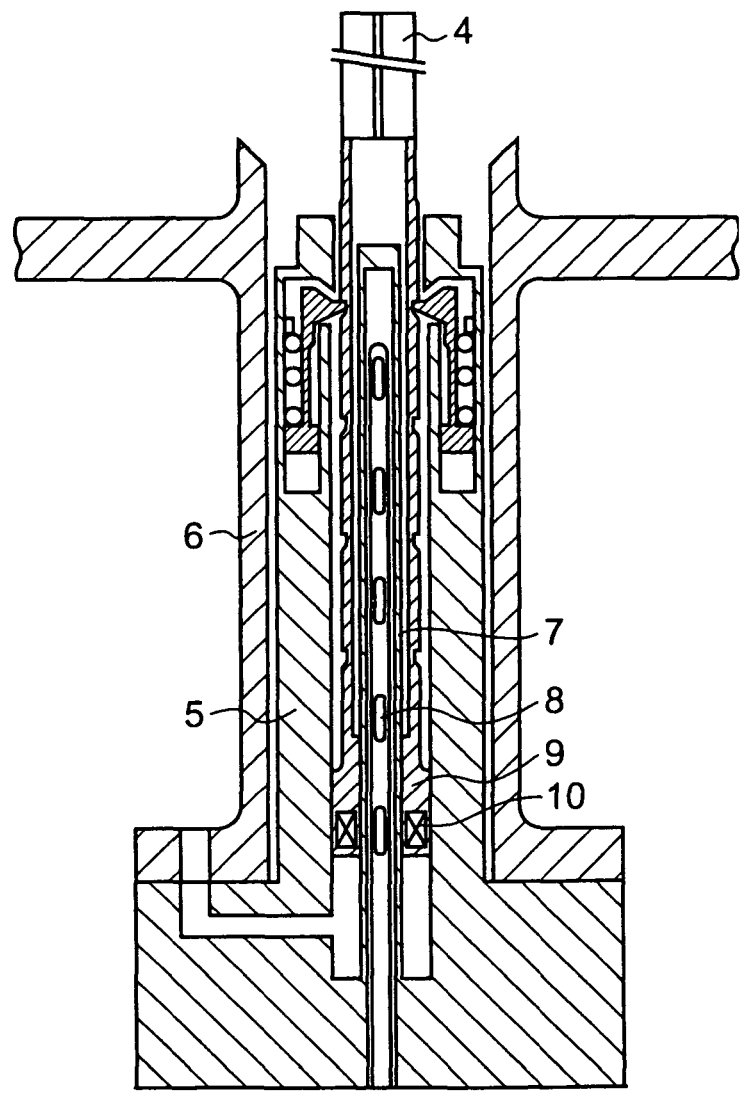
FIG. 6 is a longitudinal sectional view showing an overall control rod driving mechanism.

A control rod position detector of the present invention shown in FIG. 1 is adapted to detect a position of a control rod 4 inserted in a reactor pressure vessel 1 (see, FIG. 5). The control rod position detector includes: a ring magnet (permanent magnet) 10 that is disposed on a driving piston 9 attached on the control rod 4, the ring magnet (permanent magnet) 10 being capable of moving together with the control rod 4; and a plurality of reed switch mechanisms 31 that are arranged in the reactor pressure vessel 1 at regular intervals in an insertion direction of the control rod 4, the reed switch mechanisms 31 being operated by a magnetic flux of the ring magnet (permanent magnet) 10.

The plurality of reed switch mechanisms 31 are contained in an indicator tube 7 disposed in the reactor pressure vessel 1.

Each of the reed switch mechanisms 31 is provided with a pair of reed switches 13 and 14 that are placed so as to overlap with each other in the insertion direction of the control rod 4. The pair of reed switches 13 and 14 are connected to a connector 12 through a common wiring 11. To the connector 12, there is connected a detector 41 that detects a position of the control rod 4 based on signals from the reed switches 13 and 14.

An intermediate position between the reed switch 13 and the reed switch 14 shown in FIG. 1 corresponds to a center position where a reed switch is attached on a control rod position detector of a conventional type.

As shown in FIG. 1, one connector 12 for connecting the wiring 11 and an external wiring is disposed relative to the respective pairs of reed switches 13 and 14 of the reed switch mechanisms 31, which are connected to the detector 41 of one system.

Next, an operation of this embodiment having such a structure is described.

In FIG. 1, the control rod 4 is inserted into the reactor pressure vessel 1 and a position thereof is adjusted so as to adjust the thermal power in the reactor.

Meanwhile, the pair of reed switches 13 and 14 of the reed switch mechanism 31 adjacent to the ring magnet 10 are operated in accordance with an insertion position of the control rod 4.

Signals from the reed switches 13 and 14 are sent to the detector 41 which detects the insertion position of the control rod 4.

As shown in FIG. 1, the reed switch 13 and the reed switch 14 constituting the respective reed switch mechanisms 31 are disposed in parallel with each other. Thus, even when one or the other of the reed switches 13 and 14 of the reed switch mechanism 31 is malfunctioning, a situation in which a position of the control rod becomes unknown can be avoided.

In addition, since the malfunctioning reed switch 13 or 14 can be specified by a method which is described in detail below, the malfunctioning reed switch 13 or 14 can be repaired at a periodic inspection of a reactor. Therefore, a situation in which a position of the control rod becomes unknown can be prevented from occurring.

If one or the other of the reed switches 13 and 14 of the reed switch mechanism 31 is malfunctioning, the malfunctioning reed switch 13 or 14 can be specified by the following method described with reference to FIG. 2.

In FIG. 2, the reed switch mechanism 31 in a normal condition where both the reed switch 13 and the reed switch 14 are functioning takes a normal sensing distance 15. The reed switch mechanism 31 in a condition where the reed switch 13 is malfunctioning takes a sensing distance 17. The reed switch mechanism 31 in a condition where the reed switch 14 is malfunctioning takes a sensing distance 16. Herein, the sensing distance of the reed switch 31 with the malfunctioning reed switch 13 is provided only by the reed switch 14, while the sensing distance of the reed switch 31 with the malfunctioning reed switch 14 is provided only by the reed switch 13.

The sensing distances of the reed switches 13 and 14 are different from each other. As shown in FIG. 2, the reed switches 13 and 14 are placed such that each of the sensing distances in the insertion direction of the control rod of the reed switches 13 and 14 has an overlapped part 51 where the sensing distances of the reed switches 13 and 14 overlap with each other, and a non-overlapped part 52 where the sensing distances thereof do not overlap with each other. In this case, the reed switch 13 and the reed switch 14 are shifted from each other such that the normal sensing distance 15 of the reed switch mechanism 31 is larger than a maximum sensing distance of the sole reed switch 13 and a maximum sensing distance of the sole reed switch 14.

As shown in FIG. 2, a range of the normal sensing distance 15 of the reed switch mechanism 31 is covered by the sensing distance 16 of the reed switch 13 and the sensing distance 17 of the reed switch 14. Thus, when one or the other of the reed switches 13 and 14 is malfunctioning, the reed switch mechanism 31 adopts the sensing distance 16 or the sensing distance 17, which is shorter than the normal sensing distance 15. Therefore, when the reed switch 13 is malfunctioning, for example, the detector 41 can detect that the normal sensing distance 15 of the reed switch mechanism 31 has changed to the sensing distance 17. That is, the detector 41 can not only detect a position of the control rod 4, but also detect a malfunction of the reed switch 13 of the reed switch mechanism 31. Therefore, the malfunctioning reed switch 13 can be repaired at a periodic inspection of a reactor, so that a situation in which a position of the control rod 4 becomes unknown can be prevented from occurring.

The sensing distances of the reed switches 13 and 14 can be calculated based on sensing periods (closed periods) of the reed switches 13 and 14 during an operation of the control rod driving mechanism. That is, when a driving velocity of the control rod driving mechanism is S mm/sec, and the sensing distances of the reed switches 13 and 14 are D mm, the sensing periods t are obtained by the equation t=D/S sec. By measuring the sensing periods, the sensing distances can be calculated. For example, a normal sensing period $t_s$ when both the reed switches 13 and 14 are functioning is given by the equation $t_s=D_s/S$ sec. When the reed switch 13 is malfunctioning, a sensing period $t_b$ is given by the equation $t_b=D_b/S$ sec.

Accordingly, by comparing normal sensing distances of the reed switches 13 and 14 which are previously calculated by measuring and recording sensing periods of the reed switches 13 and 14 in a normal condition, with sensing distances of the reed switches 13 and 14 which are calculated from the sensing periods of the reed switches 13 and 14 during an operation of the control rod driving mechanism, whether the reed switch 13 or 14 is malfunctioning or not can be confirmed.

Second Embodiment

A second embodiment of the present invention is described below with reference to FIG. 3. In the second embodiment shown in FIG. 3, a resisting element 20 (resisting value $R_1$) is serially connected to a reed switch 13, while a resisting element 21 (resisting value $R_2$) is serially connected to a reed switch 14. Other members and structures are substantially the same as those of the first embodiment shown in FIGS. 1 and 2.

However, different from the first embodiment, it is not necessary that the reed switches 13 and 14 are placed such that each of the sensing distances in the insertion direction of the control rod of the reed switches 13 and 14 has an overlapped part 51 where the sensing distances of the reed switches 13 and 14 overlap with each other, and a non-overlapped part 52 where the sensing distances thereof do not overlap with each other (see, FIG. 2).

In the second embodiment shown in FIG. 3, the same reference numbers are given to the members identical to those of the first embodiment shown in FIGS. 1 and 2, and their detailed description is omitted.

As shown in FIG. 3, the reed switch 13 and the reed switch 14 constituting a reed switch mechanism 31 are disposed in parallel with each other. Thus, even when one or the other of the reed switches 13 and 14 of the reed switch mechanism 31 is malfunctioning, a situation in which a position of the control rod 4 becomes unknown can be avoided.

In FIG. 3, a resistance value of the reed switch mechanism 31 with the functioning reed switches 13 and 14 is $1/(1/R_1+1/R_2)\Omega$. When the reed switch 13 is malfunctioning, for example, a resistance value of the reed switch mechanism 31 is $R_2\Omega$. A detector 41 can detect a change in the resistance value of the reed switch mechanism 31 from $1/(1/R_1+1/R_2)\Omega$ to $R_2\Omega$, whereby a malfunction of the reed switch 13 of the reed switch mechanism 31 can be detected. Therefore, the malfunctioning reed switch 13 can be repaired at a periodic inspection of a reactor, so that a situation in which a position of the control rod 4 becomes unknown can be prevented from occurring.

Third Embodiment

A third embodiment of the present invention is described with reference to FIG. 4. In the third embodiment shown in FIG. 4, a reed switch 13 of a reed switch mechanism 31 is connected to a connector 12 through a wiring 11, while a reed switch 14 is connected to a connector 24 through a wiring 23. Other members and structures are substantially the same as those of the first embodiment shown in FIGS. 1 and 2. However, different from the first embodiment, it is not necessary that the reed switches 13 and 14 are placed such that each of the sensing distances in the insertion direction of the control rod of the reed switches 13 and 14 has an overlapped part 51 where the sensing distances of the reed switches 13 and 14 overlap with each other, and a non-overlapped part 52 where the sensing distances thereof do not overlap with each other (see, FIG. 2).

In the third embodiment shown in FIG. 4, the same reference numbers are given to the members identical to those of the first embodiment shown in FIGS. 1 and 2, and their detailed description is omitted.

As shown in FIG. 4, the control rod position detector is connected to detectors of two systems. Thus, even when one or the other of the reed switches 13 and 14 of the reed switch mechanism 31 is malfunctioning, a situation in which a position of the control rod 4 becomes unknown can be avoided.

In FIG. 4, a signal of the reed switch 13 is detected by a detector 41, while a signal of the reed switch 14 is detected by a detector 42. Thus, when the reed switch 13 is malfunctioning, for example, no signal of the reed switch 13 is detected by the detector 41, and thus a malfunction of the reed switch 13 can be detected. Therefore, the malfunctioning reed switch 13 can be repaired at a periodic inspection of a reactor, so that a situation in which a position of the control rod 4 becomes unknown can be prevented from occurring.

The invention claimed is:

1. A control rod position detector comprising:
   a permanent magnet that is attached on a control rod inserted in a reactor pressure vessel, the permanent magnet being capable of moving together with the control rod; and
   a plurality of reed switch mechanisms that are arranged in the reactor pressure vessel at regular intervals in an insertion direction of the control rod, the reed switch mechanisms being operated by a magnetic flux of the permanent magnet;
   wherein:
   each of the reed switch mechanisms is provided with a pair of reed switches that are placed so as to overlap with each other in the insertion direction of the control rod;
   the pair of reed switches are connected to a detector through wirings;
   the detector detects a position of the control rod based on signals from the reed switches;
   the reed switches respectively have sensing distances;
   each of the sensing distances has an overlapped part where the sensing distances of the pair of reed switches overlap with each other, and a non-overlapped part where the sensing distances of the pair of reed switches do not overlap with each other;
   one end of the respective reed switches in each reed switch mechanism is connected to a common wiring;
   the other end of the respective reed switches in each reed switch mechanism is connected to a common wiring; and
   all of the plural of said reed switches in each of the respective reed switch mechanism are electrically connected in parallel with each other.

2. The control rod position detector according to claim 1, wherein when one or the other of the reed switches constituting each reed switch mechanism is malfunctioning, the detector detects the malfunction of the reed switch based on a change in a sensing distance of the reed switch mechanism.

* * * * *